United States Patent
Houser et al.

(10) Patent No.: US 6,846,866 B2
(45) Date of Patent: Jan. 25, 2005

(54) SPANDEX CONTAINING A MIXTURE OF PHENOLIC

(75) Inventors: Nathan E. Houser, Afton, VA (US); Gordon W. Selling, Waynesboro, VA (US)

(73) Assignee: Invista North America S.a.r.L., Wilmington, DE (US)

( * ) Notice: Subject to any disclaimer, the term of this patent is extended or adjusted under 35 U.S.C. 154(b) by 211 days.

(21) Appl. No.: 10/162,360

(22) Filed: Jun. 3, 2002

(65) Prior Publication Data

US 2003/0073772 A1 Apr. 17, 2003

Related U.S. Application Data

(60) Provisional application No. 60/295,966, filed on Jun. 5, 2001.

(51) Int. Cl.$^7$ .............................. C08J 3/00; C08K 5/13; C08K 5/34; C08L 75/00; D02G 3/00
(52) U.S. Cl. .................. 524/348; 428/364; 428/372; 428/394; 428/395; 524/86; 524/101; 524/108; 524/115; 524/127; 524/140; 524/141; 524/145; 524/151; 524/152; 524/283; 524/287; 524/290; 524/291; 524/299; 524/323; 524/324; 524/330; 524/333; 524/334; 524/335; 524/336
(58) Field of Search ................... 524/86, 101, 108, 524/115, 127, 140, 141, 145, 151, 152, 283, 287, 290, 291, 348, 299, 336, 323, 335, 324, 334, 330, 333; 428/372, 364, 394, 395

(56) References Cited

U.S. PATENT DOCUMENTS

| | | | |
|---|---|---|---|
| 3,553,290 A | 1/1971 | Hunt | |
| 4,340,527 A | 7/1982 | Martin | |
| 4,548,975 A | 10/1985 | Lewis | |
| 4,891,391 A | 1/1990 | McEntee | |
| 5,037,870 A | 8/1991 | Gugumus | |
| 5,478,875 A | 12/1995 | Dubs et al. | |
| 5,626,960 A | 5/1997 | Carney | |
| 5,663,128 A | 9/1997 | Evans et al. | |
| 6,046,263 A | 4/2000 | Rasberger et al. | |
| 2001/0031791 A1 | 10/2001 | Carney et al. | |

FOREIGN PATENT DOCUMENTS

| | | |
|---|---|---|
| DE | 2503050 A1 | 8/1975 |
| EP | 0481533 B1 | 3/1997 |
| JP | 50004387 | 2/1975 |
| JP | 01993362 | 8/1989 |
| WO | WO 9407951 A1 | 4/1994 |

*Primary Examiner*—Patrick D. Niland
(74) *Attorney, Agent, or Firm*—Robert B. Furr, Jr.

(57) ABSTRACT

The invention provides polyurethane containing a) a first additive comprising at least one mono-hindered hydroxyphenyl group and having a molecular weight of at least about 300 Daltons;

b) a second additive selected from the group consisting of i) condensation polymers of p-cresol and divinyl benzene and ii) compounds comprising at least one unsymmetrically di-hindered hydroxyphenyl group and having a molecular weight of at least about 300 Daltons; and c) an inorganic chlorine-resist additive.

The polyurethane of the invention exhibits improved resistance to degradation by chlorine and by atmospheric fumes.

9 Claims, No Drawings

SPANDEX CONTAINING A MIXTURE OF PHENOLIC

CROSS REFERENCE TO RELATED APPLICATION

This application is a nonprovisional of provisional application No. 60/295,966, filed Jun. 5, 2001.

BACKGROUND OF THE INVENTION

1. Field of the Invention

The present invention relates to polyurethane having high resistance to degradation by chlorine and by atmospheric fumes. More particularly it relates to spandex containing particular combinations of additives.

2. Discussion of Background Art

A wide variety of phenolic compounds have been used as additives in attempts to stabilize organic compounds against degradation. For example, German Published Patent Application DE19630904 discloses phenolic compounds as additives for diisocyanates, German Published Patent Application DE2503050 discloses additives for polyolefins, Japanese Published Patent Application JP-01-193362 discloses additives for polyurethane, and U.S. Pat. Nos. 4,548,975 and 3,553,290 and Japanese Published Patent Application JP50-004387 disclose phenolic additive stabilizers for spandex. U.S. Pat. Nos. 5,663,128, 6,046,263, 4,891,391, and 5,478,875 and European Published Patent Application EP481533 also disclose additives for organic materials. U.S. Pat. Nos. 4,340,527 and 5,626,960 disclose inorganic additives for spandex.

However, further improvement in the resistance of polyurethane, and in particular spandex, to environmental degradation is still needed.

SUMMARY OF THE INVENTION

The present invention provides a polyurethane, particularly in the form of spandex, containing:

a) a first additive comprising at least one mono-hindered hydroxyphenyl group and having a molecular weight of at least about 300 Daltons;

b) a second additive selected from the group consisting of i) condensation polymers of p-cresol and divinyl benzene and ii) compounds comprising at least one unsymmetrically di-hindered hydroxyphenyl group and having a molecular weight of at least about 300 Daltons; and c) an inorganic chlorine-resist additive.

DETAILED DESCRIPTION OF THE INVENTION

It has now been found that polyurethane containing particular combinations of phenolic and inorganic additives has an unexpectedly high resistance to both combustion fumes and chlorine degradation. The combination of additives improves the chlorine resistance and exhibits a synergistic effect on the resistance to fumes of the polyurethane, which can be in the form of spandex, film, thin-walled articles such as gloves and the like.

"Spandex" means a manufactured fiber in which the fiber-forming substance is a long chain synthetic polymer comprised of at least 85% by weight of a segmented polyurethane.

"Mono-hindered hydroxyphenyl" means an hydroxyphenyl group which has an alkyl group at only one ring position adjacent to the hydroxyl group.

"Unsymmetrically di-hindered hydroxyphenyl" means an hydroxyphenyl group which has two different alkyl groups at the two ring positions adjacent to the hydroxyl group.

"Equivalent weight" means an additive's molecular weight divided by the number of hydroxyphenyl groups in the additive.

The polyurethane of the invention contains a combination of three additives, two of them acting synergistically. The first of these has at least one (preferably at least two) mono-hindered hydroxyphenyl group(s) and a molecular weight of at least about 300 Daltons. For greater efficacy and ease of synthesis, it is preferred that the alkyl group at the ring position adjacent to the phenolic hydroxyl group be a t-butyl group. It is further preferred that the first additive have an equivalent weight of no more than about 600 Daltons. Specific examples of the first additive include ethylene-1,2-bis(3-[3-t-butyl-4-hydroxyphenyl]butyrate) and ethylene-1,2-bis(3,3-bis[3-t-butyl-4-hydroxyphenyl] butyrate), in which the mono-hindered hydroxyphenyl groups are covalently bound to a bisester backbone, and 1,1-bis(2-methyl-5-t-butyl-4-hydroxyphenyl)butane and 1,1,3-tris(2-methyl-5-t-butyl-4-hydroxyphenyl)butane, in which the mono-hindered hydroxyphenyl groups are covalently bound to an alkylidene backbone.

Chemical structures and additional examples of useful first additives are shown below:

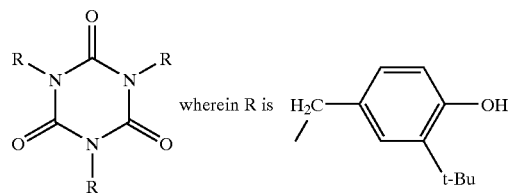

2,4,6-Tris(3-t-butyl-4-hydroxybenzyl)isocyanurate

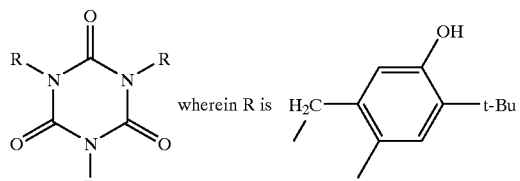

2,4,6-Tris(2-methyl-4-t-butyl-5-hydroxybenzyl)isocyanurate

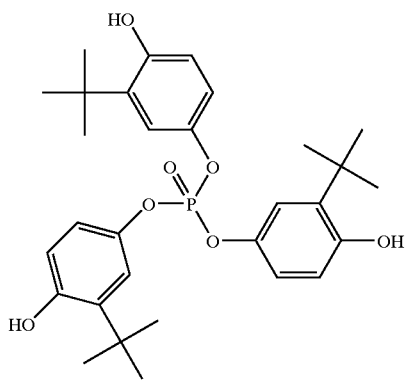

Tris(3-tert-butyl-4-hydroxyphenyl)phosphate

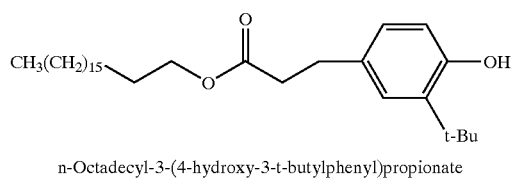

n-Octadecyl-3-(4-hydroxy-3-t-butylphenyl)propionate

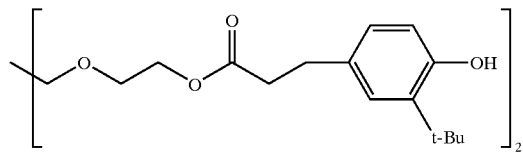

Triethylene glycol bis[3-(3-tert-butyl-4-hydroxyphenyl)propionate]

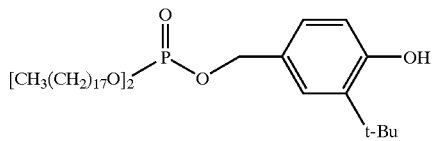

3-t-Butyl-4-hydroxybenzylphosphonic acid, dioctadecyl ester

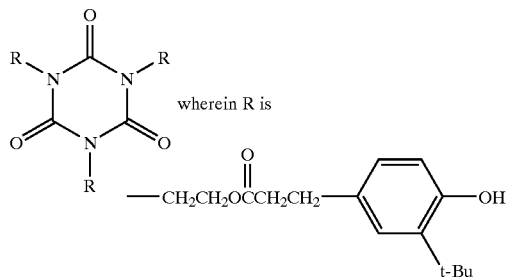

Tris[3-(3-tert-butyl-4-hydroxyphenyl)propionyloxyethyl]isocyanurate

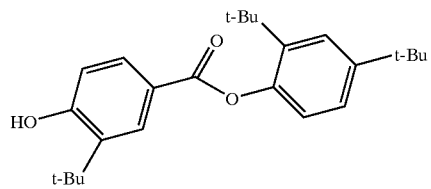

2,4-Di-t-butylphenyl-4'-hydroxy-3'-t-butylbenzoate

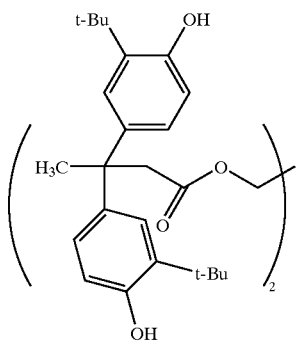

Ethylene-1,2-bis(3,3-bis[3-t-butyl-4-hydroxyphenyl]butyrate

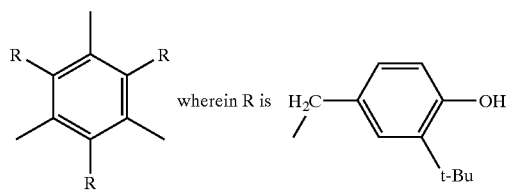

1,3,5-Dimethyl-2,4,6-tris(3-tert-butyl-4-hydroxybenzyl)benzene

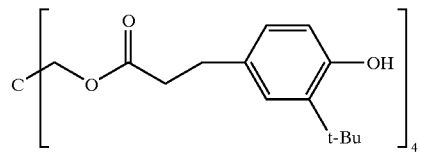

Pentaerythritol tetrakis(4-hydroxy-3-t-tbutyl)hydrocinnamate

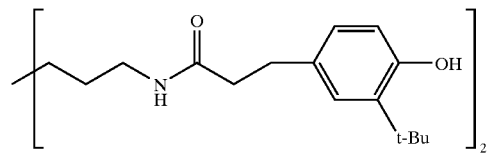

N,N'-Bis[3-(3-t-butyl-4-hydroxyphenyl)propionyl]hexamethylenediamine

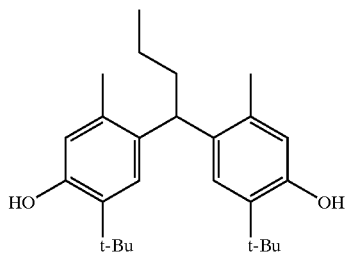

1,1-Bis(2-methyl-4-hydroxy-5-t-butylphenyl)butane

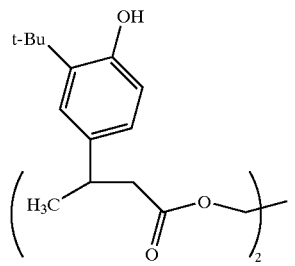

Ethylene-1,2-bis(3-[3-t-butyl-4-hydroxyphenyl]butyrate)

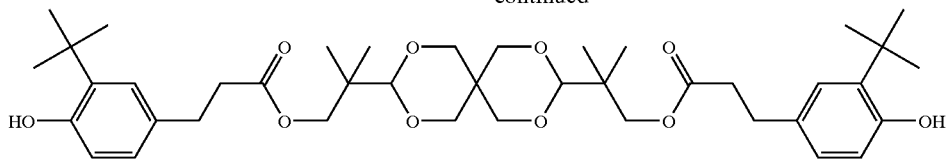

2,4,8,10-Tetraoxaspiro[5.5]undecane-3,9-diylbis(2,2-dimethyl-1,2-ethanediyl)bis-
(3-t-butyl-4-hydroxyphenyl-3-propionate)

The second additive also has a molecular weight of at least about 300 Daltons and either has at least one (preferably at least two) unsymmetrically di-hindered hydroxyphenyl group(s) or is a condensation polymer of p-cresol and divinyl benzene. Examples of the former include for example 1,3,5-tris(2,6-dimethyl-3-hydroxy-4-t-butylbenzyl) isocyanurate, in which the unsymmetrically di-hindered hydroxyphenyl groups are covalently bound to an isocyanurate backbone, and ethylene-1,2-bis (oxyethylene)bis[3-(5-t-butyl-4-hydroxy-m-tolyl) propionate], in which the unsymmetrically di-hindered hydroxyphenyl groups are covalently bound to a bisester backbone. Chemical structures of useful second additives are shown below:

spandex), of first additive be in the range of about 0.15 wt % to 3 wt % (more preferably about 0.5 wt % to 2 wt %), of second additive be in the range of about 1 wt % to 3 wt % (more preferably about 1.5 wt % to 2.5 wt %), and of inorganic additive be in the range of about 1.2 to 6.0 weight percent (more preferably about 2 to 4 weight percent).

Polymeric glycols that can be used in making the polyurethane of the present invention can have a number average molecular weight of approximately 1500–4000 and include polyether glycols, (for example poly(tetramethyleneether) glycol, poly(tetramethyleneether-co-ethyleneether) glycol, and poly(tetramethyleneether-co-2-methyltetramethyleneether) glycol), polycarbonate glycols (for example, poly (pentane-1,5-carbonate) glycol and poly(hexane-1,6-

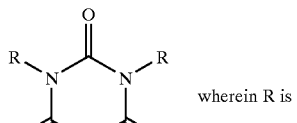

1,3,5-Tris(2,6-dimethyl-3-hydroxy-4-t-butylbenzyl)isocyanurate

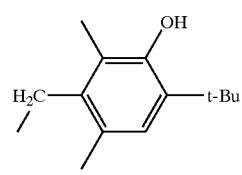

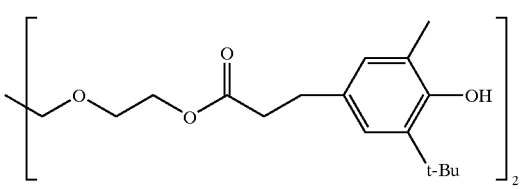

Ethylene-1,2-bis(oxyethylene)bis
[3-(5-t-butyl-4-hydroxy-m-tolyl)propionate]

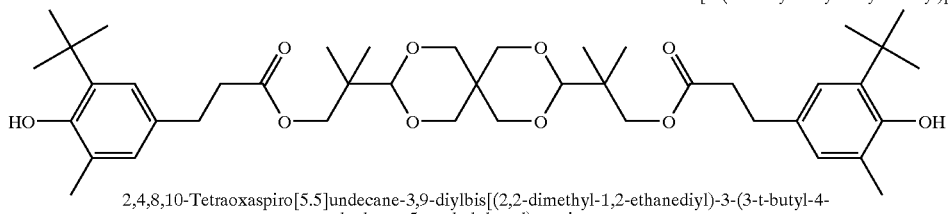

2,4,8,10-Tetraoxaspiro[5.5]undecane-3,9-diylbis[(2,2-dimethyl-1,2-ethanediyl)-3-(3-t-butyl-4-
hydroxy-5-methylphenyl)propionate It is preferred that the condensation polymer of p-cresol and divinyl benzene have a number average molecular weight of about 1000–4000(controllable, for example, by utilizing an appropriate amount of a chain terminator such as ethyl vinyl benzene). It is further preferred that the second additive have an equivalent weight of no more than about 600 Daltons.

The third additive is an inorganic chlorine-resist additive, preferably selected from the group consisting of a physical mixture of huntite (approximately $Mg_3Ca(CO_3)_4$) and hydromagnesite (approximately $Mg_4(CO_3)_4 \cdot Mg(OH)_2 \cdot 4H_2O$); Periodic Group II and IIb metal and mixed metal (for example magnesium, calcium, zinc, and barium) carbonates, oxides, and hydroxides; synthetic and naturally occurring hydrotalcite, believed to have the general formula $M^{2+}_xAl_2(OH)_{2x+6-nz}(A^{n-})_z \cdot mH_2O$, wherein M is Mg or Zn, x is a positive integer of at least 2, z is a positive integer of 2 or less, m is a positive integer, and $A^{n-}$ is an anion of valence n.

It is preferred that the amount, based on weight of polyurethane (including polyurethane in the form of carbonate) glycol), and polyester glycols (for example poly (2,2-dimethyl-1,3-propane dodecanedioate) glycol, poly (ethylene-co-1,2-propylene adipate) glycol, poly (hexamethylene-co-2,2-dimethyltrimethylene adipate) glycol, and poly(ethylene-co-butylene adipate) glycol).

Diisocyanates that can be used in making the polyurethane of this invention include 1-isocyanato-4-[(4-isocyanatophenyl)methyl]benzene ("4,4'-MDI"), 1-isocyanato-2-[(4-isocyanatophenyl)methyl]benzene ("2,4'-MDI"), mixtures of 4,4'-MDI and 2,4'-MDI, bis(4-isocyanatocyclohexyl)methane, 5-isocyanato-1-(isocyanatomethyl)-1,3,3-trimethylcyclohexane, 1,3-diisocyanato-4-methyl-benzene, and mixtures thereof.

When a polyurethane is desired, the chain extender utilized in making the polymer is a diol, for example ethylene glycol, 1,3-propane diol, and 1,4-butane diol, and mixtures thereof. Optionally, a monofunctional alcohol chain terminator such as butanol can be used to control polymer molecular weight, and a higher functional alcohol 'chain brancher' such as pentaerythritol can be used to control viscosity. The resulting polyurethanes can be melt-spun, dry-spun, or wet-spun into spandex.

When a polyurethaneurea (a sub-class of polyurethanes) is desired, the chain extender is a diamine, for example ethylene diamine, 1,3-butanediamine, 1,4-butanediamine, 1,3-diamino-2,2-dimethylbutane, 1,6-hexanediamine, 1,2-propanediamine, 1,3-propanediamine, N-methylaminobis(3-propylamine), 2-methyl-1,5-pentanediamine, 1,5-diaminopentane, 1,4-cyclohexanediamine, 1,3-diamino-4-methylcyclohexane, 1,3-cyclohexanediamine, 1,1'-methylene-bis(4,4'-diaminohexane), 3-aminomethyl-3,5,5-trimethylcyclohexane, 1,3-diaminopentane, m-xylylene diamine, and mixtures thereof. Optionally, a chain terminator, for example diethylamine, cyclohexylamine, or n-hexylamine, can be used to control the molecular weight of the polymer, and a trifunctional 'chain brancher' such as diethylenetriamine can be used to control solution viscosity. Polyurethaneureas are typically dry-spun or wet-spun when spandex is desired.

Certain other additives can also be present in the spandex of the invention, provided they do not detract from the beneficial effects of the invention. Such additives can include titanium dioxide, barium sulfate, UV screeners, dye assists such as quaternary amines, hindered amine light stabilizers, antitack agents such as metal stearates and ethylene bis-stearamide, silicone oil, and the like.

In preparation for determining the effect of combustion fumes on the spandex in the Examples, the fiber was wound under low tension on an 8-cm×11-cm×0.2-cm aluminum card to form a layer 3–4 millimeters thick. The wound card was immersed in water containing 1.5 g/l of Supralate® EP (a sulfate detergent, Witco Corp.) and 1.5 g/l of sodium pyrophosphate, and the bath was heated to boiling for 1 hour (scour). The cards were then rinsed with water and put into a water bath adjusted to pH 5 with dilute phosphoric acid (further adjusted with dilute aqueous sodium hydroxide if necessary), and the bath was heated to boiling for 30 minutes (mock dye), after which the cards were rinsed with distilled water and air-dried. Fiber discoloration is usually manifested in an undesirable increase in yellowness, so the Hunter "b" scale (yellowness-blueness) values of the fiber on the cards were measured with a Spectraflash 300 reflectance spectrophotometer (Datacolor International, calibrated against the manufacturer's standard reference plates) and recorded as the initial "b-value".

The spandex, still on the aluminum card, was then exposed to combustion fumes for a time sufficient to cause a "delta-b" value of about 4–5 units in the 1.5 wt % Cyanox® 1790 control sample (Comparison Samples 4, 10, and 12); the test duration was typically 8 to 16 hours. The test was carried out similarly to that of Test Method 23-1962 of the American Association of Textile Chemists and Colorists using a Model 8727 atmospheric fume chamber (United States Testing Company, Inc.). The chamber was supplied with combustion fumes generated by burning propane (Roberts Oxygen Co., Inc.) with a Bunsen burner adjusted to give a predominantly blue flame. The flame height was such that the temperature in the chamber was kept between 57° C. and 63° C. Finally, the after-test "b-value" of each fiber was determined, and the difference between the initial b-value and after-test b-value was calculated and recorded as "delta-b". Low values of delta-b indicate that the test generated little discoloration in the fiber.

To measure the resistance of the spandex to chlorine induced degradation, a 9-cm long loop of 44-dtex, 4-coalesced-filament spandex yarn was subjected to tension imposed by a 10-gram weight suspended from the sample and exposed to chlorinated water containing 3.5-ppm of active chlorine at 25° C. and pH 7.6. As-spun samples were exposed with no additional treatments. Prior to exposure, 0.15 gram of urea was added to the bath so that the bath contained about 1.7 ppm urea. During exposure, water and urea were lost from the pool due to evaporation and degradation by bleach, respectively. To replace this loss, at hourly intervals, 90 mL of a 7-ppm urea/water solution was added to the bath via a pump with a timer. The hours of exposure until the sample broke was measured. The "hours-to-break" data for all samples were ratioed (normalized) to the sample containing 1.5% Cyanox® 1790. Therefore, the larger the number in the "Chlorine Resistance" column in Tables 2 and 3, the greater the resistance of the spandex sample to chlorine degradation.

In Tables 1, 2, and 3 "Comp." indicates a comparison sample, and "%" means weight percent. "Observed difference" is the difference in the values (delta-b) observed for samples with and without stabilizer additives. "Expected difference" is the sum of the observed differences. Fume delta-b values were from a single test for Table 1.

Cyanox® 1790 (Cytec Industries), is 1,3,5-tris(2,6-dimethyl-4-t-butyl-3-hydroxybenzyl)isocyanurate. Irganox® 245 (Ciba Specialty Chemicals Corporation) is ethylene-1,2-bis(oxyethylene)bis[3-(5-t-butyl-4-hydroxy-m-tolyl)propionate]. Cyanox® 1790 and Irganox® 245 have unsymmetrically di-hindered hydroxyphenyl groups. Methacrol® 2390, a registered trademark of E. I. du Pont de Nemours and Company, is a condensation polymer of p-cresol and divinylbenzene. Hostanox® 03 (Clariant Corporation), is ethylene-1,2-bis(3,3-bis[3-t-butyl-4-hydroxyphenyl]butyrate) and has mono-hindered hydroxyphenyl groups covalently bound to a bisester backbone. Lowinox® 44B25 (Great Lakes Chemicals, Inc.) is 1,1-bis(2-methyl-5-t-butyl-4-hydroxyphenyl)butane. Lowinox(® CA22 (Great Lakes Chemicals) is 1,1,3-tris(2-methyl-5-t-butyl-4-hydroxyphenyl)butane. Lowinox® 44B25 and Lowinox® CA22 have mono-hindered hydroxyphenyl groups covalently bound to an alkylidene backbone.

EXAMPLE 1

A polyurethaneurea was first prepared by capping a poly(tetramethylene ether) glycol, number-average molecular weight of about 1800, with 1-isocyanato-4-[(4-isocyanatophenyl)methyl]benzene at a diisocyanate:glycol molar ratio of about 1.69:1.0 to form a capped glycol, dissolving the capped glycol in dimethylacetamide, chain extending and chain terminating with a mixture of ethylene diamine, 2-methylpentamethylene diamine (90/10 mole ratio), diethylamine, additional dimethylacetamide.

To form spinning solutions, additive slurries were mixed into the diluted polymer solutions so that the final spandex contained 4 wt % of a mixture of huntite and hydromagnesite (Ultracarb® UF, Microfine Minerals, Ltd., an inorganic chlorine-resist additive), 0.3 wt % titanium dioxide, 0.5 wt % of a polymer of bis(4-isocyanatocyclohexyl)methane and 3-t-butyl-3-aza-1,5-pentanediol (Methacrol® 2462B, a registered trademark of E. I. du Pont de Nemours and Company), 0.3 wt % silicone oil, and as much of the other additives as indicated in the Tables, all based on the weight of the spandex. The solutions were dry-spun, and groups of four filaments were coalesced to give 40 denier (44 dtex) spandex samples to which was applied about 4 wt % of a finish comprising 96 wt % silicone oil and 4 wt % magnesium stearate.

TABLE 1

| Sample | Cyanox® 1790, wt % | Methacrol® 2390, wt % | Hostanox® 03, wt % | Fume delta-b Observed values | Observed difference | Expected difference |
|---|---|---|---|---|---|---|
| Comp. 1 | 0 | 0 | 0 | 11.6 | — | — |
| Comp. 2 | 0 | 0 | 0.25 | 20.2 | 8.6 | — |
| Comp. 3 | 0 | 0 | 0.5 | 25.0 | 13.4 | — |
| Comp. 1 | 0 | 0 | 0 | 11.6 | — | — |
| Comp. 4 | 1.5 | 0 | 0 | 4.3 | −7.3 | — |
| 1 | 1.5 | 0 | 0.25 | 5.5 | −6.1 | +1.3 |
| 2 | 1.5 | 0 | 0.5 | 6.2 | −5.4 | +6.1 |
| Comp. 1 | 0 | 0 | 0 | 11.6 | — | — |
| Comp. 5 | 0 | 1.0 | 0 | 11.8 | +0.2 | — |
| 3 | 0 | 1.0 | 0.25 | 13.8 | +2.2 | +8.7 |
| 4 | 0 | 1.0 | 0.5 | 15.7 | +4.1 | +13.6 |

In Table 1, the 'delta-b' difference (or net change) expected for Sample 1 (1.5 wt % Cyanox® 1790 plus 0.25 wt % Hostanox® 03) vs. Comparison Sample 1 (no stabilizers) was +1.3 units because Hostanox® 03 alone (Comparison Sample 2) increased 'delta-b' by 8.6 units while Cyanox® 1790 alone (Comparison Sample 4) decreased 'delta-b' by 7.3 units. However, the actual, observed difference was unexpectedly greater, the combination of Cyanox® 1790 and Hostanox® 03 reducing 'delta-b' by 6.1 units.

EXAMPLE 2

Example 1 was repeated, using Cyanox® 1790, Methacrol® 2390, and various levels of Hostanox® 03. The resistance of the spandex to both fume and chlorine was determined. The results are shown in Table 2.

TABLE 2

| Samples | Antioxidant | Fume delta-b (observed values) | Chlorine Resistance, normalized |
|---|---|---|---|
| Comp. 6 | none | 13.3 | 0.80 |
| Comp. 7 | 0.25% Hostanox ® 03 | 23.2 | 0.92 |
| Comp. 8 | 0.5% Hostanox ® 03 | 28.7 | 1.48 |
| Comp. 9 | 1.5% Hostanox ® 03 | 33.3 | 2.14 |
| Comp. 10 | 1.5% Cyanox ® 1790 | 5.0 | 1.00 |
| 5 | 1.5% Cyanox ® 1790 + 0.25% Hostanox ® 03 | 6.2 | 1.26 |
| 6 | 1.5% Cyanox ® 1790 + 0.5% Hostanox ® 03 | 8.8 | 1.41 |
| 7 | 1.5% Cyanox ® 1790 + 0.75% Hostanox ® 03 | — | 1.51 |
| 8 | 1.5% Cyanox ® 1790 + 1% Hostanox ® 03 | 9.6 | 1.68 |
| 9 | 1.5% Cyanox ® 1790 + 2% Hostanox ® 03 | — | 1.87 |
| Comp. 11 | 1% Methacrol ® 2390 | 12.8 | 1.36 |
| 10 | 1% Methacrol ® 2390 + 0.25% Hostanox ® 03 | 14.7 | 1.48 |
| 11 | 1% Methacrol ® 2390 + 0.5% Hostanox ® 03 | 11.7 | 1.46 |

In Table 2, the fume delta-b and chlorine resistance data are averages of multiple tests. Comparison Samples 10, to which the other chlorine resistance data were normalized, exhibited a time-to-break of about 74 hours. When Ultracarb® UF was omitted from spandex samples otherwise corresponding to Comparison Samples 10, the time-to-break was typically about 18 hours. As can be seen from the data in Table 2, the use of additive Hostanox® 03 of this invention improved chlorine resistance in all instances and, when used in combination with the other additives, making up the synergistic combination of two of the stabilizing additives, led to acceptable discoloration of the spandex.

The significance of these data in Tables 1 and 2 is that, while Hostanox® 03 alone led to unacceptable yellowing of the fiber, the combination of Hostanox® 03 with either Cyanox® 1790 or Methacrol® 2390 led to a much diminished yellowing, a synergistic effect totally unexpected and surprising.

Also, while Hostanox® 03 is a known stabilizing additive for certain polymers, its effect on greatly increasing chlorine resistance of spandex was not known prior to this invention and it is especially unexpected that such an increase can be achieved over that already contributed by the inorganic additive.

EXAMPLE 3

Example 1 was repeated, but using Lowinox® 44B25 and Lowinox® CA22 in place of Hostanox® 03, and using Irganox® 245 in place of Cyanox® 1790. The fume exposure time was 12 hours. The results are presented in Table 3.

TABLE 3

| Sample | Cyanox ® 1790, wt % | Lowinox ® 44B25, wt % | Lowinox ® CA22, wt % | Irganox ® 245, wt % | Hostanox ® 03, wt % | Fume resistance (delta-b) | Chlorine resistance, normalized |
|---|---|---|---|---|---|---|---|
| Comp. 12 | 1.5 | 0 | 0 | 0 | 0 | 4.8 | 1.00 |
| Comp. 13 | 0 | 1.0 | 0 | 0 | 0 | 10.0 | 1.38 |
| 12 | 1.5 | 1.0 | 0 | 0 | 0 | 5.4 | 1.31 |
| Comp. 12 | 1.5 | 0 | 0 | 0 | 0 | 4.8 | 1.00 |
| Comp. 14 | 0 | 0 | 0.9 | 0 | 0 | 11.1 | 1.22 |
| 13 | 1.5 | 0 | 0.9 | 0 | 0 | 5.7 | 1.23 |
| Comp. 15 | 0 | 0 | 0 | 0 | 1 | 10.6 | 0.76 |
| Comp. 16 | 0 | 0 | 0 | 1.5 | 0 | 5.8 | 0.83 |
| 14 | 0 | 0 | 0 | 1.5 | 1 | 4.5 | 1.25 |

The results in Table 3 further show that combinations of first additives comprising mono-hindered hydroxyphenyl groups (for example Lowinox® 44B25, Lowinox® CA22, and Hostanox® 03), second additives comprising unsymmetrically di-hindered hydroxyphenyl groups (for example Irganox® 245 and Cyanox® 1790), and inorganic chlorine-resist additives (for example Ultracarb® UF) provide an unexpected combination of high resistance by spandex to both fumes and chlorine.

The observed tendency for fume delta-b values to rise as the first additive level is increased (at constant second additive levels) suggests that the relative amounts of the two additives be controlled for best results, with the amount of second additive being increased to resist yellowing as the amount of first additive is increased to resist chlorine degradation.

What is claimed is:

1. Polyurethane containing:
   a) a first additive comprising at least one mono-hindered hydroxyphenyl group and having a molecular weight of at least about 300 Daltons;
   b) a second additive selected from the group consisting of i) condensation polymers of p-cresol and divinyl benzene and ii) compounds comprising at least one unsymmetrically di-hindered hydroxyphenyl group and having a molecular weight of at least about 300 Daltons; and
   c) an inorganic chlorine-resist additive.

2. The polyurethane of claim 1 in the form of spandex.

3. The spandex of claim 2 wherein:
   the first additive has an equivalent weight of no more than about 600 Daltons,
   the second additive has an equivalent weight of no more than about 600 Daltons and comprises at least one unsymmetrically di-hindered hydroxyphenyl group, and
   the inorganic additive is selected from the group consisting of hydrotalcite, a physical mixture of huntite and hydromagnesite, Periodic Group II and IIb metal compounds selected from the group consisting of carbonates, oxides, and hydroxides, and Periodic Group II and IIb mixed metal compounds selected from the group consisting of carbonates, oxides, and hydroxides.

4. The spandex of claim 2 wherein
   the first additive is present in the range of about 0.15 wt % to 3 wt %,
   the second additive is present in the range of about 1 wt % to 3 wt %, and
   the inorganic additive is present in the range of about 1.2 to 6.0 weight percent,
   based on weight of spandex.

5. The spandex of claim 2 wherein:
   the first additive comprises at least two mono-hindered hydroxyphenyl groups bound to a backbone selected from the group consisting of bisesters and alkylidenes;
   the second additive comprises at least two unsymmetrically di-hindered hydroxyphenyl groups bound to a backbone selected from the group consisting of isocyanurates and bisesters; and
   the inorganic additive is selected from the group consisting of a physical mixture of huntite and hydromagnesite, hydrotalcite, and zinc oxide.

6. The polyurethane of claim 1 wherein the first additive is ethylene-1,2-bis(3,3-bis[3-t-butyl-4-hydroxyphenyl] butyrate), the second additive is a condensation polymer of p-cresol and divinyl benzene having a number average molecular weight between about 1000 and 4000, and the inorganic additive is selected from the group consisting of a physical mixture of huntite and hydromagnesite, hydrotalcite, and zinc oxide.

7. The spandex of claim 2 wherein the first additive is ethylene-1,2-bis(3,3-bis[3-t-butyl-4-hydroxyphenyl] butyrate), the second additive is 2,4,6-tris(2,6-dimethyl-4-t-butyl-3-hydroxybenzyl)isocyanurate and the inorganic additive is selected from the group consisting of a physical mixture of huntite and hydromagnesite, hydrotalcite, and zinc oxide.

8. The spandex of claim 2 wherein the first additive is selected from the group consisting of 1,1-bis(2-methyl-5-t-butyl-4-hydroxyphenyl)butane and 1,1,3-tris(2-methyl-5-t-butyl-4-hydroxyphenyl)butane the second additive is 2,4,6-tris(2,6-dimethyl-4-t-butyl-3-hydroxybenzyl)isocyanurate and the inorganic additive is selected from the group consisting of a physical mixture of huntite and hydromagnesite, hydrotalcite, and zinc oxide.

9. The spandex of claim 5 wherein:
   the first additive comprises at least two mono-hindered hydroxyphenyl groups bound to a bisester backbone and is present at about 0.5 wt % to 2 wt % based on weight of spandex;
   the second additive comprises at least two unsymmetrically di-hindered hydroxyphenyl groups bound to an isocyanurate backbone and is present at about 1.5 wt % to 2.5 wt % based on weight of spandex; and
   the inorganic additive is present at about 2 wt % to 4 wt %, based on weight of spandex.

* * * * *